UNITED STATES PATENT OFFICE.

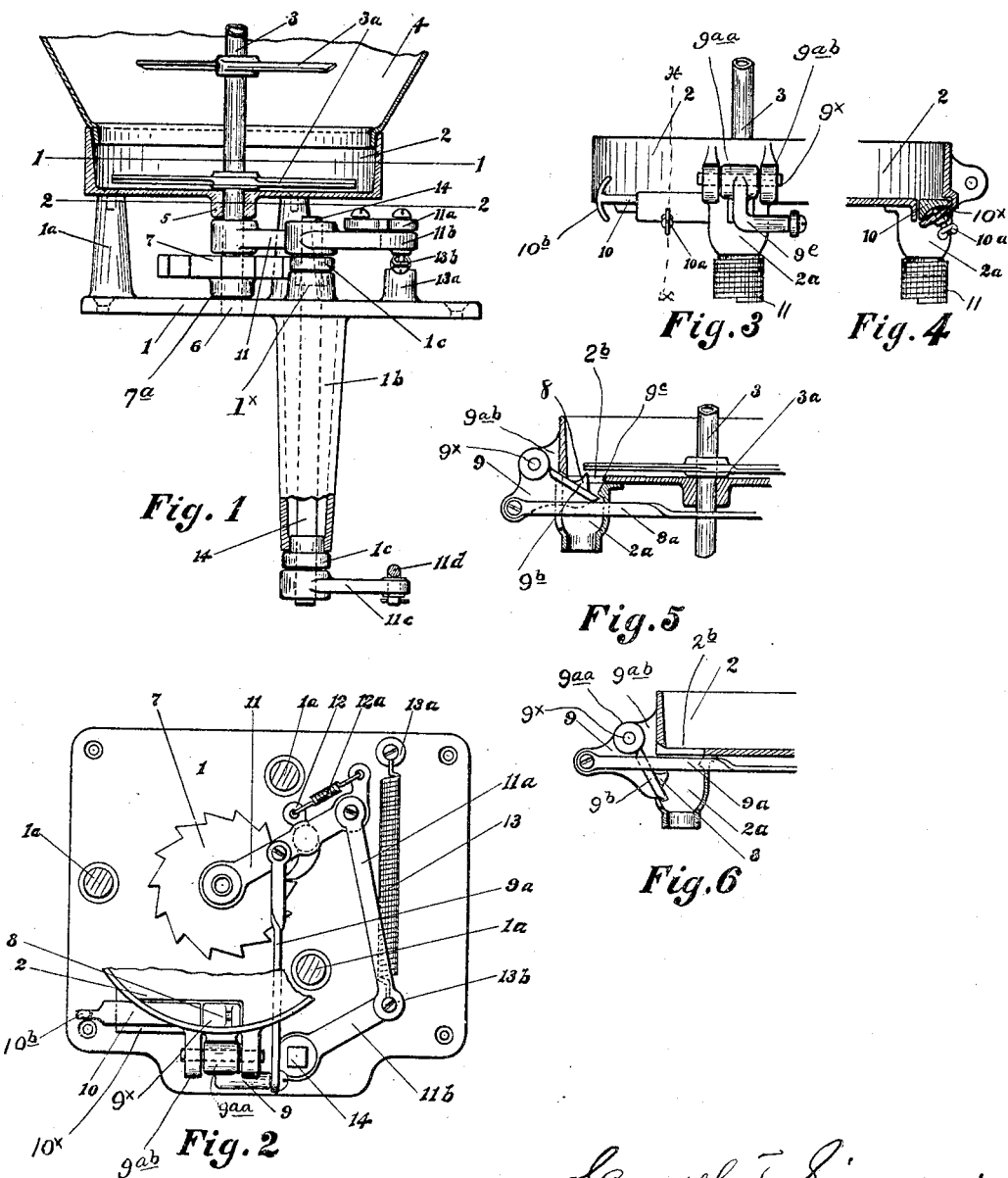

SAMUEL T. SIMMONS AND WALTER T. MOORE, OF COLUMBUS, OHIO.

SANDER.

No. 810,309.  Specification of Letters Patent.  Patented Jan. 16, 1906.

Application filed August 15, 1905. Serial No. 274,326.

*To all whom it may concern:*

Be it known that we, SAMUEL T. SIMMONS and WALTER T. MOORE, citizens of the United States, residing at Columbus, in the county of Franklin and State of Ohio, have invented new and useful Improvements in Sanders, of which the following is a specification.

Our invention relates to improvements in sanders designed more especially for use in connection with railroads.

It has for its object, among other things, to provide for delivering or feeding in a uniform manner sand or other granulated substance to the rails in a wet, dry, or crusted state.

The nature of said invention consists in certain structural features, substantially as hereinafter disclosed, and particularly pointed out by the claims.

The simple and novel construction employed by us is fully described herein, and illustrated by the accompanying drawings, wherein is disclosed the preferred embodiment of our invention, and in which—

Figure 1 is a view thereof with certain parts in section and others in side elevation. Fig. 2 is a sectional view produced upon the lines 1 and 2 of Fig. 1. Fig. 3 is a broken-away detailed view showing more particularly the cut-off and regulator. Fig. 4 is a vertical section taken upon the line $x$ $x$ of Fig. 3. Fig. 5 is a like section produced through the cut-off; and Fig 6 is also a like view of the same parts, the cut-off being shown in "open" position.

In carrying out our invention we provide the hopper 4, which contains the sand or other granulated substance for delivery or distribution upon the track-rails with a separate, preferably circular, bottom member 2, and through a shoulder or bearing equipped opening 5 of the latter passes and is suitably held in position the vertical shaft 3, carrying agitating or stirring arms $3^a$ for loosening the contents of said hopper as heretofore employed by us.

Suitably suspended, preferably by posts $1^a$ and adjunctive parts, as shown, from the hopper-bottom member 2 is a plate or support 1, having a "step" or socket 6, forming a bearing for the bottom end of the shaft 3, and depending from the latter is a sleeve or bearing $1^b$, through which passes a shaft 14, suitably upheld therein by collars $1^c$, one fixed to said shaft below or outside of said sleeve and the other to said shaft above and resting upon a second sleeve $1^x$, upstanding from the support or plate 1. Said shaft has fixed to it, near its lower end, a collar-ended arm $11^c$, to which arm is suitably applied a rod $11^d$ or pedal for providing for actuating the same and in turn the shaft 14 for a purpose presently made apparent.

A ratchet pinion or wheel 7 is suitably fixed to the shaft 3, it having a boss or shoulder formation $7^a$ upon its under side resting upon the plate or support 1, the purpose of which is obvious. A lever 11 has one end loosely applied to the same shaft and is fulcrumed intermediately of its ends to the contiguous end of a link or pitman $9^a$, connected at its opposite end to what is preferably termed a "cut-off" 9, presently again referred to. Said lever carries a pawl or dog 12, effective to engage and actuate the ratchet-pinion 7 as well as to hold it against reverse movement, said pawl or dog being held effectively in engagement with said ratchet-pinion by the action of a spring $12^a$, having its ends connected to the outer end of said dog or pawl and the corresponding end of said lever, respectively.

A second link or bar $11^a$ effects connection between the lever 11 near its outer end and the arm $11^b$ at its corresponding end to provide for transmitting the movement of the pedal or rod-actuated shaft 14 through said arm to said lever, in turn actuating the shaft 3 for operating the sand agitator or stirrer, as in loosening the hopper contents. These several parts are held normally in position under the action or stress of a spring 13, suitably connected, as at $13^a$, to the plate or support 1, and as at $13^b$ to the point of conjunction between the link $11^a$ and the arm $11^b$, as disclosed by Fig. 2.

The cut-off 9 previously introduced and which moves in an arc in a vertical plane is practically of bell-crank formation, being pivoted or hung at its upper inner angle upon a pivot or pintle $9^x$, inserted through eye brackets or lugs $9^{ab}$ upon the hopper-bottom member 2 and through an eye or sleeve terminal at that angle or horn of the cut-off, as seen in Fig. 3. Said cut-off has an upward-presented right-lined or plane surface, as $9^b$, its free edge being effective to engage or abut upon an "undercut" shoulder $9^c$ of the delivery-nozzle $2^a$ of the outlet-opening $2^b$ of the hopper-bottom member 2 for cutting off the delivery or feeding of the sand to the track-rails. Said cut-off has upon its plane or right-lined surface an upward-extending projection or stud 8, which when the cut-off is closed enters or projects into the outlet-opening $2^b$ and penetrates the contents of the hopper-bottom member for readily loosening and thus preventing the choking up said opening by said contents, as it is apparent that as the valve or cut-off is withdrawn or removed, so as to uncover the opening, the withdrawal of the projection or stud from said contents, which of course simultaneously takes place, will have the effect to start the movement of the latter. Said cut-off is equipped with a preferably right-angled arm $9^e$, which is an integral part thereof, and to this arm or lever, at its outer end, is connected one end of the pitman $9^a$, whose opposite end is connected to the lever 11, as before stated, receiving movement indirectly from the shaft 14, and whereby the cut-off is actuated and simultaneously with the actuation of the agitator 3 $3^a$, as is apparent and for obvious purposes.

A regulator 10, of preferably the general outline as disclosed particularly by Fig. 4, or practically triangular in cross-section, is fitted or housed within a trough-like formation or extension $10^x$ of the hopper-bottom member 2, taking under said regulator laterally of and opening through the outlet-nozzle $2^a$ in horizontal alinement with the outlet-opening $2^b$, whereby by suitably loosening the regulator and moving it by grasping its handle-terminated end portion $10^b$ it may be adjusted, as is apparent, to reduce said outlet-opening, or if it has thus previously been reduced or congested it may be more or less enlarged by reversely moving said cut-off, thus providing for varying the delivery or feeding of the sand or other material through the nozzle $2^a$ and conductor 11, attached to the latter, to the track-rails.

A set or holding screw and nut $10^a$, supplied to the regulator-containing extension $10^x$, is provided to hold the regulator 10 effectively in adjusted position, as is plain.

We claim—

1. A device of the character described, having a cut-off itself, of practically bell-crank formation, adapted to move in an arc, in a vertical plane, and provided with a clearer entering the discharge-outlet and serving to loosen the contents of the member having said outlet.

2. A device of the character described, having a cut-off itself of practically bell-crank formation, pivoted at one angle or horn to move in an arc, in a vertical plane and effective to close the discharge-outlet, and means for actuating said cut-off.

3. A device of the character described, having a cut-off itself of practically bell-crank formation and pivoted at one angle or horn to move in the plane of the discharge-outlet and to effect the closing thereof, a lever, means for actuating said lever and a pitman effecting connection between said lever and cut-off.

4. A device of the character described, having a cut-off effective to close the discharge-outlet, a lever and means for actuating said lever comprising a pedal or otherwise actuated shaft equipped with an arm, a link between said arm and lever, and a pitman effecting connection between said lever and an arm of said cut-off.

5. A device of the character described, comprising a cut-off effective to close the discharge-outlet, a lever, means for actuating said lever including a pedal or otherwise actuated shaft equipped with a fixed arm, a link between said arm and lever, a pitman effecting connection between said lever and an arm of said cut-off and a spring effective to hold said parts in normal position.

6. A device of the character described, comprising a regulator suitably supported in position upon a hopper-bottom member and arranged to vary the size of the discharge-outlet and its housing equipped with a set or holding.

7. A device of the character described, comprising a hopper member, a pedal or otherwise actuated shaft having a fixed arm, a cut-off to close the discharge-outlet, an agitator arranged in said hopper member and having its shaft equipped with a ratchet-pinion, a lever connected to said ratchet-equipped shaft and carrying a spring-pressed dog or pawl engaging said ratchet-pinion, a pitman connecting said lever and an arm of said cut-off, a link effecting connection between said lever and arm, and a spring holding the aforesaid parts in normal effective position.

In testimony whereof we affix our signatures in presence of two subscribing witnesses.

SAMUEL T. SIMMONS.
WALTER T. MOORE.

Witnesses:
E. E. MOORE,
FRED. H. SCHOEDING, Jr.